(12) United States Patent
Suzuki (10) Patent No.: US 8,686,672 B2
(45) Date of Patent: Apr. 1, 2014

(54) MOTOR CONTROL DEVICE AND ELECTRIC POWER STEERING DEVICE

(75) Inventor: Hiroshi Suzuki, Okazaki (JP)

(73) Assignee: Jtekt Corporation, Osaka (JP)

( * ) Notice: Subject to any disclaimer, the term of this patent is extended or adjusted under 35 U.S.C. 154(b) by 601 days.

(21) Appl. No.: 12/990,687

(22) PCT Filed: Aug. 20, 2009

(86) PCT No.: PCT/JP2009/064547
§ 371 (c)(1),
(2), (4) Date: Nov. 2, 2010

(87) PCT Pub. No.: WO2010/021353
PCT Pub. Date: Feb. 25, 2010

(65) Prior Publication Data
US 2011/0127934 A1    Jun. 2, 2011

(30) Foreign Application Priority Data

Aug. 22, 2008   (JP) .............................. 2008-214393

(51) Int. Cl.
*H02P 21/00* (2006.01)

(52) U.S. Cl.
USPC ................ 318/400.02; 318/432; 318/434

(58) Field of Classification Search
USPC .................... 318/400.02, 432, 434
See application file for complete search history.

(56) References Cited

U.S. PATENT DOCUMENTS

| | | | | |
|---|---|---|---|---|
| 5,923,728 A | * | 7/1999 | Ikkai et al. | 318/807 |
| 6,427,104 B1 | | 7/2002 | Matsushita et al. | |
| 7,489,099 B2 | * | 2/2009 | Fujiwara et al. | 318/609 |
| 7,960,927 B2 | * | 6/2011 | Chen | 318/400.07 |
| 7,986,116 B2 | * | 7/2011 | Imura et al. | 318/400.15 |
| 8,269,441 B2 | * | 9/2012 | Morimoto et al. | 318/400.14 |
| 2005/0285555 A1 | | 12/2005 | Chen et al. | |
| 2008/0069547 A1 | * | 3/2008 | Jiang | 388/811 |
| 2009/0160381 A1 | * | 6/2009 | Imura et al. | 318/400.15 |

FOREIGN PATENT DOCUMENTS

| | | |
|---|---|---|
| CN | 1715095 A | 1/2006 |
| JP | A-6-153569 | 5/1994 |
| JP | A-2003-40128 | 2/2003 |
| JP | A-2006-129632 | 5/2006 |
| JP | A-2007-274781 | 10/2007 |

OTHER PUBLICATIONS

International Search Report dated Oct. 27, 2009 in International Patent Application No. PCT/JP2009/064547 (with translation).
Dec. 3, 2012 Office Action issued in Chinese Patent Application No. 200980119417.7 (with translation).

* cited by examiner

*Primary Examiner* — Erick Glass
(74) *Attorney, Agent, or Firm* — Oliff PLC (57) ABSTRACT

A current command value computation section 22 is provided with a q-axis current command value correction section 31 and an expected voltage utilization factor computation section 32. The expected voltage utilization factor computation section 32 estimates an expected voltage utilization factor f based on a rotational angular velocity ω of a motor 12, a q-axis current command value Iq*, and a power voltage Vb (the maximum voltage Vmax). The expected voltage utilization factor f is the ratio of required output voltage to the maximum voltage Vmax applicable to a drive circuit 18. Based on the expected voltage utilization factor f, the q-axis current command value correction section 31 corrects the q-axis current command value Iq* such that the corrected expected voltage utilization factor f does not exceed a predetermined value that corresponds to the voltage saturation limit.

4 Claims, 9 Drawing Sheets

MOTOR CONTROL DEVICE AND ELECTRIC POWER STEERING DEVICE

FIELD OF THE INVENTION

The present invention relates to a motor control device and an electric power steering device.

BACKGROUND OF THE INVENTION

Electric power steering devices (EPS) are required to have a motor that rotates smoothly and quietly. In many cases, brushless motors are used as the drive source for electric power steering devices. Typically, such a motor is controlled via a sine wave energization applied to each phase (U, V, W) based on the current control in the d/q coordinate system.

When there is an upper limit for the output voltage of the motor control device, the required output voltage can exceed the highest value (for example, power voltage) of voltage applicable to a drive circuit, for example, at high speed rotation of the motor. This phenomenon is referred to as voltage saturation. Voltage saturation can cause torque ripple and unpleasant noise.

Figure 9:
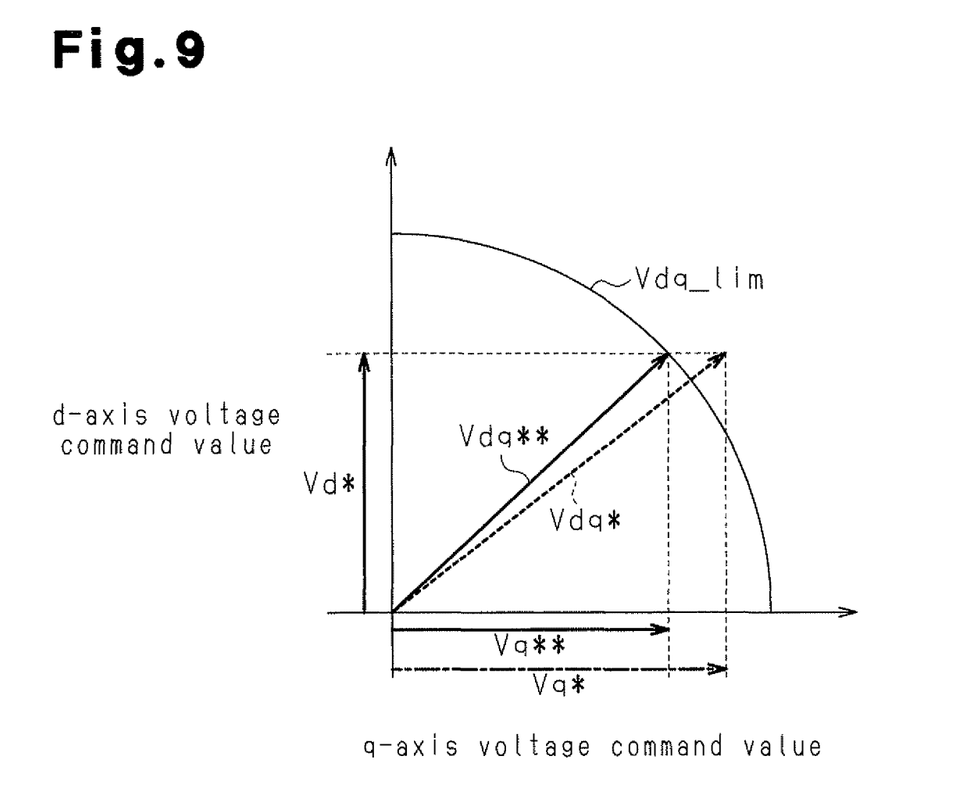
FIG. 9 is a graph for explanatory illustration of a voltage limiting control (guard against voltage saturation).

To suppress the occurrence of voltage saturation, a voltage limiting process for limiting a voltage command value (guard against voltage saturation) is conventionally executed. For example, a limit value in the voltage limiting process is determined in advance based on the standards and specifications of a drive circuit. As shown in FIG. 9, voltage saturation occurs when the resultant vector Vdq* of a d-axis voltage command value Vd* and a q-axis voltage command value Vq* exceeds a voltage limit value Vdq_lim, which is set in advance. At this time, the d-axis voltage command value Vd* and the q-axis voltage command value Vq* are each corrected such that the resultant vector Vdq* after the correction is less than or equal to the voltage limit value Vdq_lim.

FIG. 9 shows an example in which the q-axis voltage command value Vq* is lowered while maintaining the d-axis voltage command value Vd*. Correction may be executed in other manners. For example, the d-axis voltage command value Vd* and the q-axis voltage command value Vq* may be corrected to maintain the angle of the resultant vector Vdq* after voltage saturation starts.

Problems caused by such voltage saturation can be avoided by expanding the rotation range of the motor through execution of the field weakening control. For example, Patent Document 2 discloses a motor control device (steering device) that initiates the field weakening control based on a q-axis current deviation. The motor control device disclosed in Patent Document 3 computes a voltage saturation factor, which indicates the degree of voltage saturation, based on a voltage command value used in current control. The phase of the current command value is corrected in accordance with the voltage saturation factor, so as to lower the current command value as well as to weaken the field. As a result, voltage saturation is effectively prevented.

PRIOR ART DOCUMENTS

Patent Documents

Patent Document 1: Japanese Laid-Open Patent Publication No. 6-153569
Patent Document 2: Japanese Laid-Open Patent Publication No. 2003-40128
Patent Document 3: Japanese Laid-Open Patent Publication No. 2006-129632

SUMMARY OF THE INVENTION

Problems that the Invention is to Solve

However, in a high-speed, high-torque range, where voltage saturation occurs (voltage saturation range), the voltage limiting process causes the q-axis voltage command value Vq* to change depending on the d-axis voltage command value Vd*. Changes in the d/q-axis current therefore tends to be amplified, and the resultant fluctuation can cause torque ripple and noise. In the configuration disclosed in Patent Document 2, voltage saturation often starts before the q-axis current deviation reaches the threshold value. This is likely to delay the start of the field weakening control. Likewise, the start of the field weakening control is likely to be delayed in the configuration disclosed in Patent Document 3, in which the field weakening control is started depending on the voltage command value based on a current deviation.

Accordingly, it is an objective of the present invention to provide a motor control device and an electric power steering device that prevent torque ripple and noise from occurring in a voltage saturation range, and allow a motor to rotate smoothly.

Means for Solving the Problems

To achieve the foregoing objective and in accordance with a first aspect of the present invention, a motor control device is provided that includes a motor control signal generator for generating a motor control signal by executing current control in a d/q coordinate system, and a drive circuit for outputting three-phase drive power to a motor based on the motor control signal. Based on a rotational angular velocity of the motor and a current command value in the d/q coordinate system, the motor control signal generator estimates an expected voltage utilization factor, which is the ratio of a required output voltage to a maximum voltage applicable to the drive circuit, and corrects the current command value such that the expected voltage utilization factor does not exceed a predetermined value that corresponds to a voltage saturation limit.

According to the above configuration, voltage saturation is prevented from occurring. This allows the motor current to be always controlled without executing voltage limiting control. As a result, the occurrence of torque ripple and noise is effectively suppressed. Further, by estimating the expected voltage utilization factor based on the current command value prior to the execution of the current control, it is possible to eliminate the influence of the deviation between the current command and the actual current in the current control, so that the occurrence of voltage saturation is quickly prevented in a transient stage to voltage saturation.

The motor control signal generator preferably computes a d-axis current command value to execute field weakening control such that the expected voltage utilization factor does not exceed the predetermined value. When the expected voltage utilization factor exceeds a limit value in a range that can be dealt by the field weakening control, the motor control signal generator preferably reduces a q-axis current command value, thereby correcting the current command value such that the expected voltage utilization factor does not exceed the predetermined value.

According to the above configuration, voltage saturation is prevented from occurring in a wider range. Also, after the expected voltage utilization factor reaches the limit value in the range that can be dealt by the field weakening control, the current command value is lowered to maximize the output performance of the electric power steering device. That is, in the use of an electric power steering device, it is important not only to reduce vibration and noise, but also to improve the basic performance. Thus, employing the above configuration, the basic performance and the quietness are both enhanced by maximizing the output performance of the motor, which serves as drive source.

In the above motor control device, the motor control signal generator preferably reduces the q-axis current command value such that the expected voltage utilization factor does not exceed the predetermined value.

In the above motor control device, the motor control signal generator preferably computes a d-axis current command value to execute field weakening control such that the expected voltage utilization factor does not exceed the predetermined value.

According to each of the above configurations, voltage saturation is prevented from occurring. This allows the motor current to be always controlled without executing voltage limiting control. As a result, the occurrence of torque ripple and noise is effectively suppressed. Particularly, the execution of the field weakening control prevents the torque from being lowered by reduction in the current command value. It is therefore possible to maintain a high output performance even in the voltage saturation range.

To achieve the foregoing objective and in accordance with a second aspect of the present invention, an electric power steering device including the above motor control device is provided.

According to the above configuration, a motor control device and an electric power steering device are provided that prevent torque ripple and noise from occurring in a voltage saturation range and allows a motor to rotate smoothly.

DETAILED DESCRIPTION OF THE PREFERRED EMBODIMENTS

First Embodiment

An electric power steering device (EPS) according to a first embodiment of the present invention will now be described with reference to the drawings.

Figure 1:
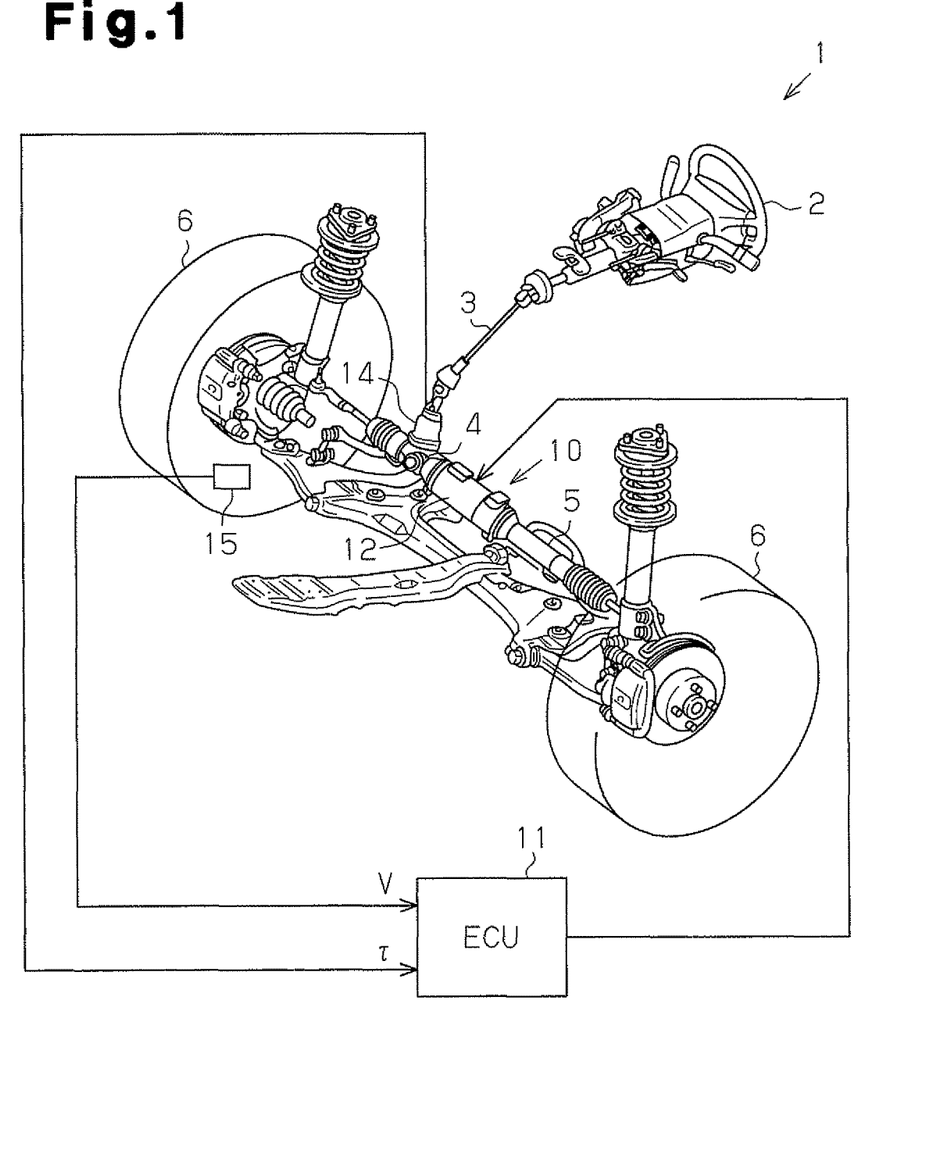
FIG. 1 is a schematic diagram showing an electric power steering device (EPS) according to a first embodiment of the present invention.

As shown in FIG. 1, a steering wheel (steering) 2 is fixed to a steering shaft 3. The steering shaft 3 is coupled to a rack 5 via a rack-and-pinion mechanism 4. Rotation of the steering shaft 3 accompanying a steering operation is converted into a reciprocating linear motion of the rack 5 by the rack-and-pinion mechanism 4. The reciprocating linear motion of the rack 5 changes the steering angle of steerable wheels 6.

The EPS 1 includes an EPS actuator 10 serving as a steering force assist device, and an ECU 11 serving as control means. The EPS actuator 10 applies an assist force that assists a steering operation of the steering system. The ECU 11 controls operation of the EPS actuator 10.

The EPS actuator 10 is a rack type EPS actuator in which a motor 12 serving as a drive source is arranged coaxially with the rack 5. Motor torque generated by the motor 12 is transmitted to the rack 5 via a ball screw mechanism (not shown). The motor 12 is a brushless motor and is rotated by receiving three-phase (U, V, W) electric drive power from the ECU 11. The ECU 11 serving as a motor control device controls the assist force applied to the steering system by controlling the assist torque generated by the motor 12 (power assist control).

A torque sensor 14 and a vehicle speed sensor 15 are connected to the ECU 11. The torque sensor 14 detects steering torque $\tau$, and the vehicle speed sensor 15 detects vehicle speed V. Based on the steering torque $\tau$ and the vehicle speed V, the ECU 11 controls actuation of the EPS actuator 10, that is, performs power assist control.

The electrical configuration of the EPS 1 according to the first embodiment will now be described.

Figure 2:
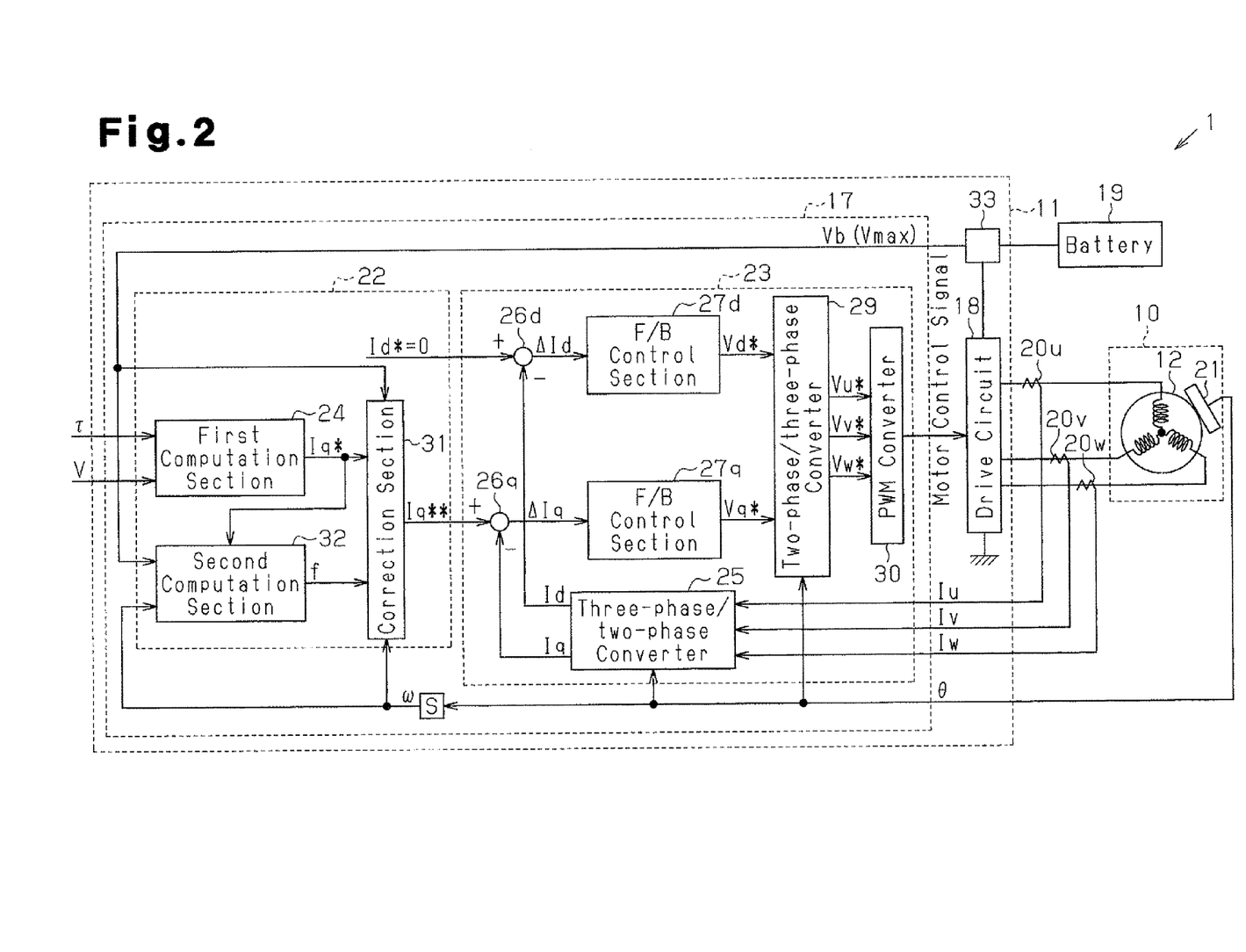
FIG. 2 is a block diagram showing the electrical configuration of the EPS according to the first embodiment of the present invention.

As shown in FIG. 2, the ECU 11 includes a microcomputer 17 and a drive circuit 18. The microcomputer 17 is a motor control signal output device that outputs a motor control signal. The drive circuit 18 supplies the motor 12 with three-phase drive power based on the motor control signal.

The drive circuit 18 is a known PWM inverter having three pairs of switching elements as base units (arms). The switching elements in each pair are connected in series, and the pairs each correspond to one of the phases. A motor control signal output from the microcomputer 17 defines an ON-duty cycle of each switching element forming the drive circuit 18. Each switching element is turned ON or OFF in response to a motor control signal applied to the gate terminal of the switching element. Accordingly, three-phase (U, V, W) drive power is generated based on the power voltage Vb of a battery 19, and supplied to the motor 12.

Current sensors $20u$, $20v$, $20w$ for detecting phase current values Iu, Iv, Iw supplied to the motor 12 and a rotational angle sensor 21 for detecting a rotational angle $\theta$ of the motor 12 are connected to the ECU 11. The microcomputer 17 outputs the motor control signal to the drive circuit 18 based on the phase current values Iu, Iv, Iw and the rotational angle $\theta$ of the motor 12 detected based on output signals from the sensors, the steering torque $\tau$, and the vehicle speed V.

The following control blocks in the microcomputer 17 are realized by computer programs executed by the microcomputer 17.

The microcomputer 17 includes a current command value computation section 22 and a motor control signal generating section 23 serving as a motor control signal generator. The current command value computation section 22 computes a current command value, which is a control target amount of the assist force applied to the steering system. The motor control signal generating section 23 generates a motor control signal for controlling the operation of the drive circuit 18.

The current command value computation section 22 includes a first computation section 24, which serves as a q-axis current command value computation section. The first computation section 24 computes a q-axis current command value Iq* in the d/q coordinate system based on the steering torque τ and the vehicle speed V. The current command value computation section 22 corrects the q-axis current command value Iq* and sends the corrected q-axis current command value Iq** to the motor control signal generating section 23.

The motor control signal generating section 23 receives, along with the q-axis current command value Iq** from the current command value computation section 22, the phase current values Iu, Iv, Iw detected by the current sensors 20u, 20v, 20w, and the rotational angle θ detected by the rotational angle sensor 21. In the first embodiment, the d-axis current command value Id* is zero (Id*=0). The motor control signal generating section 23 executes current feedback control of the d/q coordinate system based on the phase current values Iu, Iv, Iw and the rotational angle θ (electrical angle), thereby generating the motor control signal.

That is, in the motor control signal generating section 23, the phase current values Iu, Iv, Iw are input to a three-phase/two-phase converter 25 together with the rotational angle θ. The three-phase/two-phase converter 25 converts the phase current values Iu, Iv, Iw to a d-axis current value Id and a q-axis current value Iq of the d/q coordinate system. The q-axis current command value Iq** input to the motor control signal generating section 23 is input to a subtractor 26q together with the q-axis current value Iq. The d-axis current command value Id* is input to a subtractor 26d together with the d-axis current value Id. The subtractor 26d computes a d-axis current deviation aid, which is then input to an F/B control section 27d. The subtractor 26q computes a q-axis current deviation ΔIq, which is input to an F/B control section 27q. The F/B control section 27d executes feedback control for causing the d-axis current value Id, which is an actual current, to follow the d-axis current command value Id*, which is a control target value. The F/B control section 27q executes feedback control for causing the q-axis current value Iq, which is an actual current, to follow the q-axis current command value Iq**, which is a control target value. Specifically, the F/B control section 27d multiplies the d-axis current deviation ΔId by a predetermined F/B gain(PI gain), thereby computing a d-axis voltage command value Vd*. The F/B control section 27q multiplies the q-axis current deviation ΔIq by a predetermined F/B gain (PI gain), thereby computing a q-axis voltage command value Vq*. The d-axis voltage command value Vd* and the q-axis voltage command value Vq* are input to a two-phase/three-phase converter 29 together with the rotational angle θ. The two-phase/three-phase converter 29 converts the d-axis voltage command value Vd*, the q-axis voltage command value Vq*, and the rotational angle θ to three-phase voltage command values Vu*, Vv*, Vw*.

The voltage command values Vu*, Vv*, Vw* are input to a PWM converter 30. The PWM converter 30 generates duty command values corresponding to the voltage command values Vu*, Vv*, Vw*. The motor control signal generating section 23 generates a motor control signal containing ON duty cycles represented by the duty command values. The microcomputer 17 outputs the motor control signal to (gate terminals of) switching elements forming the drive circuit 18. Accordingly, the operation of the drive circuit 18, that is, the supply of drive power to the motor 12 is controlled.

(Voltage Saturation Prevention Control)

The voltage saturation prevention control according to the first embodiment will now be described.

As shown in FIG. 2, the current command value computation section 22 has a q-axis current command value correction section (hereinafter, referred to as correction section) 31, which corrects the q-axis current command value Iq*. In the first embodiment, the correction section 31 executes correction of the q-axis current command value Iq* to prevent voltage saturation from occurring.

The current command value computation section 22 includes a second computation section 32, which serves as an expected voltage utilization factor computation section. The second computation section 32 computes (estimates) an expected voltage utilization factor f, which is the ratio of required output voltage to the maximum voltage Vmax applicable to the drive circuit 18. The correction section 31 corrects the q-axis current command value Iq* based on the expected voltage utilization factor f, which is estimated by the second computation section 32.

Specifically, the second computation section 32 receives rotational angular velocity (electrical angular velocity) ω of the motor 12 and the q-axis current command value Iq*. The second computation section 32 also receives the power voltage Vb, which is the maximum voltage Vmax applicable to the drive circuit 18. The power voltage Vb is detected by a voltage sensor 33 provided on a power supply line between the drive circuit 18 and the battery 19. The second computation section 32 estimates an expected voltage utilization factor f based on the rotational angular velocity ω, the q-axis current command value Iq*, and the power voltage Vb (the maximum voltage Vmax).

The second computation section 32 executes computation for estimating the expected voltage utilization factor f based on the following expression (1).

$$f = 2\sqrt{\frac{2}{3}} \frac{\sqrt{(\omega L I_q^*)^2 + (R I_q^* + \Phi\omega)^2}}{V_{max}} \qquad (1)$$

In the expression (1), L represents an inductance (d/q axis conversion), R represents a motor resistance (d/q axis conversion), φ represents a constant expressed by an expression φ=√(3/2)×ϕ, in which the maximum value of interlinkage magnetic flux is expressed by ϕ.

In a low load, low rotation speed state (normal state), if the d-axis current command value Id* is zero (Id*=0), and temporal variation of the q-axis current command value Iq* is determined to be small, the following voltage expressions (2), (3) are satisfied.

$$V_d = -\omega L I_q^* \qquad (2)$$

$$V_q = R I_q^* + \phi\omega \qquad (3)$$

Further, when control is executed in the d/q coordinate system based on these voltage expressions, the amplitude of each phase voltage after being converted to the three-phase coordinate system is expressed by Va. In this case, if the maximum voltage that can be output by the drive circuit 18 is equal to the maximum voltage Vmax applicable to the drive circuit 18, the following expression (4) must be satisfied to execute sine wave energization.

$$V_a = \sqrt{\frac{2}{3}(V_d^2 + V_q^2)} \leq \frac{V_{max}}{2} \qquad (4)$$

Therefore, the expected voltage utilization factor f is defined as shown in the following expression (5). By substituting the expressions (2), (3) into the expression (5), the expression (1) is obtained, which is an estimation expression of the expected voltage utilization factor f.

$$f = \frac{2V_a}{V_{max}} = 2\sqrt{\frac{2}{3}} \frac{\sqrt{V_d^2 + V_q^2}}{V_{max}} \qquad (5)$$

The correction section 31 determines whether the expected voltage utilization factor f, which has been estimated by the second computation section 32, exceeds a predetermine value f0, which corresponds to a voltage saturation limit that is a transient value beyond which voltage saturation occurs. The predetermined value f0 is set to a value close to one (f0≤1). If the expected voltage utilization factor if exceeds the predetermined value f0 (f>f0), a new q-axis current command value Iq** is computed based on the following expressions (6), (7). In this manner, the q-axis current command value Iq* computed by the current command value computation section 22 is corrected (renewed).

$$I_q^{**} = \frac{1}{4} \frac{-4R\Phi\omega + \sqrt{6V_{max}^2 R^2 f_0^2 + 6L^2\omega^2 V_{max}^2 f_0^2 - 16\omega^4 L^2 \Phi^2}}{R^2 + \omega^2 L^2} \quad (I_q^* > 0) \qquad (6)$$

$$I_q^{**} = \frac{1}{4} \frac{-4R\Phi\omega - \sqrt{6V_{max}^2 R^2 f_0^2 + 6L^2\omega^2 V_{max}^2 f_0^2 - 16\omega^4 L^2 \Phi^2}}{R^2 + \omega^2 L^2} \quad (I_q^* < 0) \qquad (7)$$

The expressions (6), (7) are obtained by substituting f0 for f in the expression (1), and solving the expression (1) for the q-axis current command value Iq* (Iq). Current control based on the new q-axis current command value Iq obtained in this manner keeps the expected voltage utilization factor f below or equal to the predetermined value f0.

To prevent the occurrence of voltage saturation, the q-axis current command value Iq* is corrected based on the expressions (6), (7). That is, the q-axis current command value Iq* is lowered.

A procedure of the voltage saturation prevention control will now be explained with reference to FIG. 3.

Figure 3:
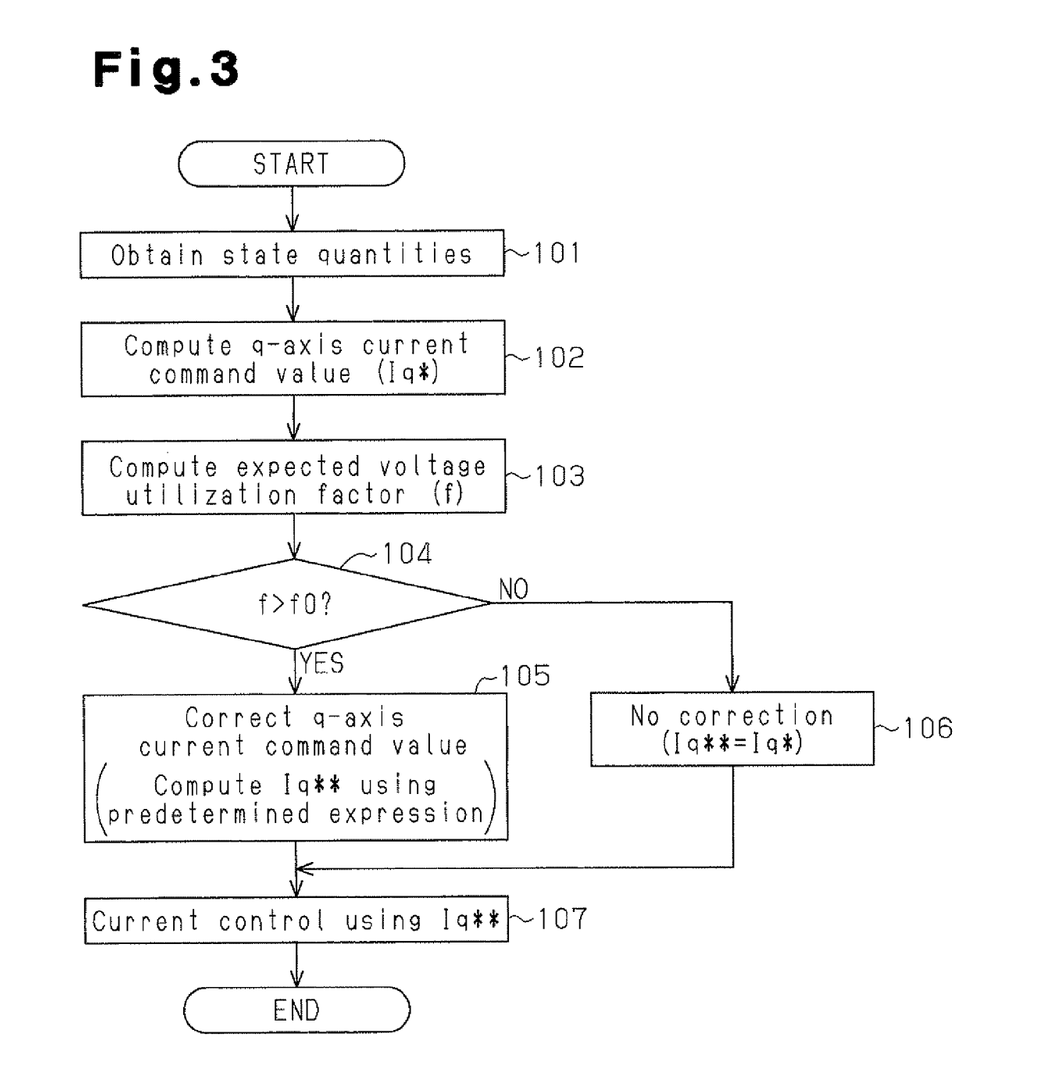
FIG. 3 is a flowchart showing a procedure of voltage saturation prevention control.

As shown in FIG. 3, the microcomputer 17 obtains state quantities such as the steering torque τ and vehicle speed V (step 101), and then computes the q-axis current command value Iq* (step 102). Next, the microcomputer 17 computes the expected voltage utilization factor f based on the expression (1) (step 103), and determines whether the expected voltage utilization factor f exceeds the predetermined value f0, which corresponds to the voltage saturation limit (step 104). If the expected voltage utilization factor f is greater than the predetermined value f0 (f>f0, step 104: YES), the microcomputer 17 computes a new q-axis current command value Iq** based on the expressions (6), (7), thereby correcting (renewing) the q-axis current command value Iq* computed in step 105.

In step 104, if the expected voltage utilization factor f is not greater than the predetermined value f0 (f≤f0, step 104: NO), the microcomputer 17 does not execute the correction (renewal) (Iq**=Iq*, step 106). Based on the corrected q-axis current command value Iq, the microcomputer 17 executes current control in the d/q coordinate system (step 107**).

The first embodiment has the following operations and advantages.

(1) The microcomputer 17 estimates the expected voltage utilization factor f, which is the ratio of required output voltage to the maximum voltage Vmax applicable to the drive circuit 18. The microcomputer 17 corrects the q-axis current command value Iq* such that the expected voltage utilization factor f does not exceed the predetermined value that corresponds to the voltage saturation limit. Accordingly, voltage saturation is prevented from occurring. This allows the motor current to be always controlled without executing voltage limiting control. As a result, the occurrence of torque ripple and noise is effectively suppressed.

(2) The microcomputer 17 estimates the expected voltage utilization factor f based on the q-axis current command value Iq* prior to the execution of the current control. It is thus possible to eliminate the influence of the deviation between the current command (Iq*) and the actual current (Iq) in the current control, so that the occurrence of voltage saturation is quickly prevented in a transient stage to voltage saturation.

Second Embodiment

An electric power steering device (EPS) according to a second embodiment of the present invention will now be described with reference to the drawings.

The second embodiment is different from the first embodiment mainly in the structure of a current command value computation section and voltage saturation prevention control. To facilitate illustration, like or the same reference numerals are given to those components that are like or the same as the corresponding components of the first embodiment, and the explanations are omitted.

Figure 4:
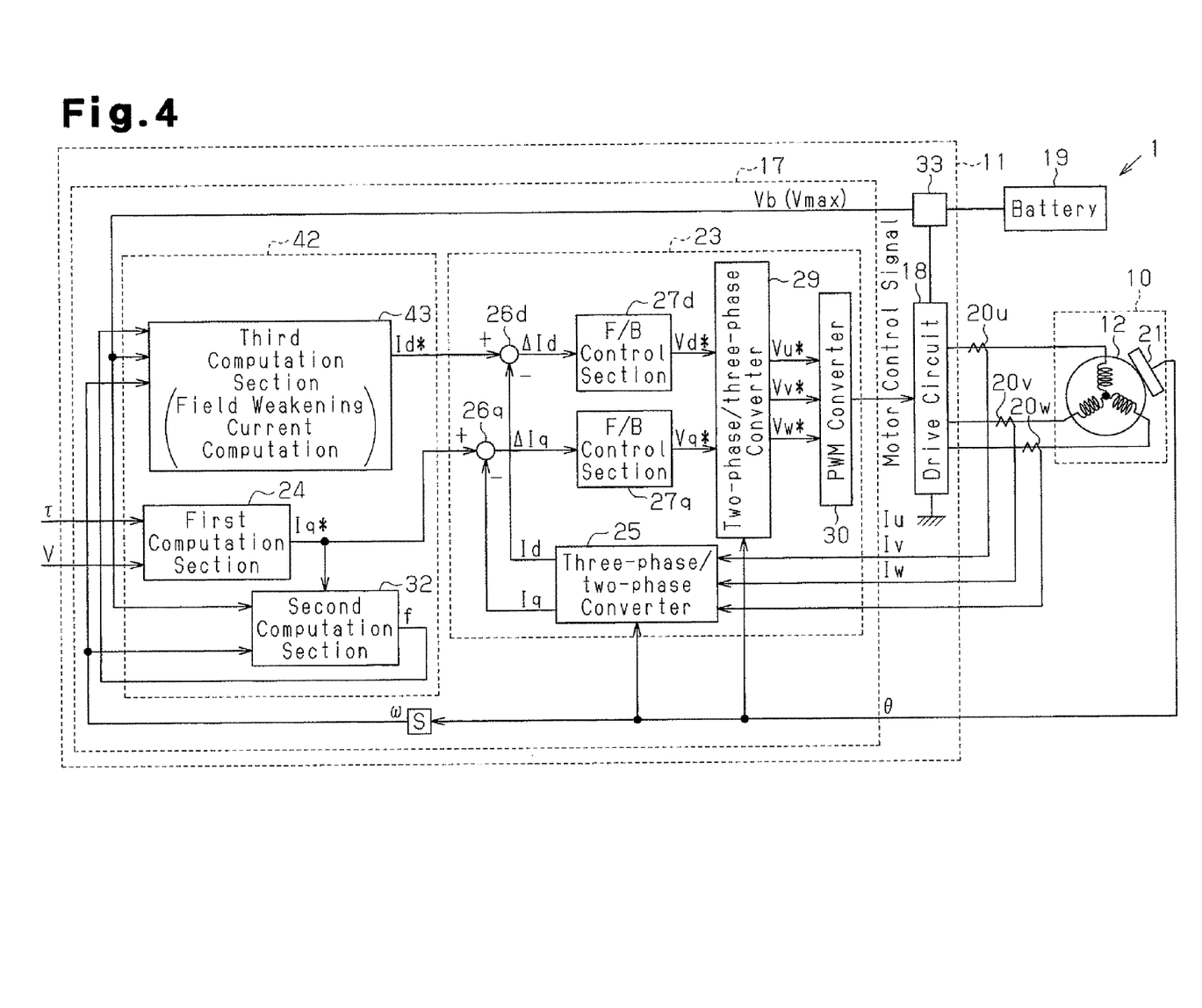
FIG. 4 is a block diagram showing the electrical configuration of the EPS according to a second embodiment of the present invention.

As shown in FIG. 4, in place of the correction section 31 of the first embodiment (see FIG. 2), a current command value computation section 42 includes a third computation section 43, which serves as a d-axis current command value computation section for computing the d-axis current command value Id*. The third computation section 43 receives an expected voltage utilization factor f estimated by the second computation section 32. If the expected voltage utilization factor f exceeds the predetermined value f0, which corresponds to the voltage saturation limit (f>f0), the third computation section 43 computes a d-axis current command value Id* for executing field weakening control. That is, by computing a field weakening current, the occurrence of the voltage saturation is suppressed.

Specifically, the third computation section 43 computes a field weakening current (the d-axis current command value Id*) based on the following expression (8).

$$I_d^* = \frac{-4L\omega^2\Phi + \sqrt{16L^2\omega^4\Phi^2 - 6\omega^2 L^2 V_{max}^2(f^2 - f_0^2) - 6R^2 V_{max}^2(f^2 - f_0^2)}}{4(R^2 + \omega^2 L^2)} \qquad (8)$$

The voltage expression is expressed by the following expressions (9), (10) when the d-axis current is taken into consideration.

$$V_d = RI_d^* - \omega LI_q^* \qquad (9)$$

$$V_q = RI_q^* + \Phi\omega + \omega LI_d^* \qquad (10)$$

An expected voltage utilization factor f' in the field weakening control is expressed by the following expression (11), which is obtained by substituting the expressions (9), (10) into the expression (5).

$$f' = 2\sqrt{\frac{2}{3}} \frac{\sqrt{(RI_d^* - \omega LI_q^*)^2 + (RI_q^* + \Phi\omega + \omega LI_d^*)^2}}{V_{max}} \qquad (11)$$

To prevent voltage saturation from occurring, the d-axis current command value Id* only needs to be computed such that the expected voltage utilization factor f' in the field weakening control is less than or equal to the predetermined value f0, which corresponds to the voltage saturation limit.

Thus, the following expression (12) is obtained by subtracting the expression (11) from the expression (1).

$$f^2 - f'^2 = -\frac{8}{3}\frac{(R^2 + \omega^2 L^2)I_d^{*2} + 2\Phi\omega^2 L I_d^*}{V_{max}} \tag{12}$$

The expression (8) is obtained by solving the expression (12) for the d-axis current command value Id*.

Figure 5:
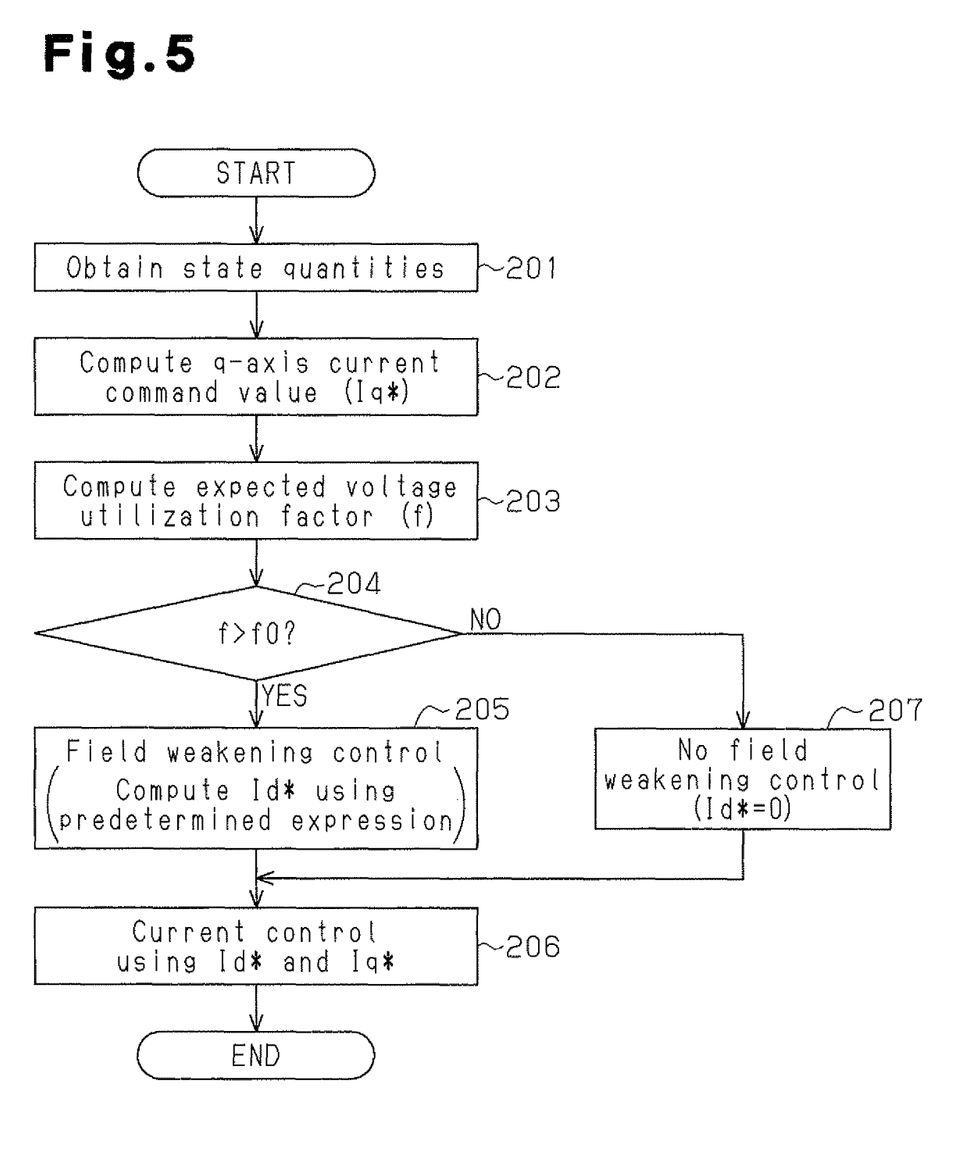
FIG. 5 is a flowchart showing a procedure of voltage saturation prevention control.

If the expected voltage utilization factor if exceeds the predetermined value f0, which corresponds to the voltage saturation limit (f>f0, see FIG. 5, step 204: YES), the microcomputer 17 computes the d-axis current command value Id* based on the expression (8) in step 205. The microcomputer 17 then executes current control using the d-axis current command value Id*, which corresponds to the field weakening current (and the q-axis current command value Iq*), in step 206. This allows the motor current to be efficiently controlled, while suppressing the occurrence of voltage saturation.

In step 204, if the expected voltage utilization factor if is not greater than the predetermined value f0 (f≤f0, step 104: NO), the microcomputer 17 computes the d-axis current command value Id* to be zero: Id*=0 (step 207). In this case, the microcomputer 17 executes the current control with Id*=0, and thus does not execute the field weakening control.

According to the second embodiment, the occurrence of voltage saturation is prevented in a transient stage before voltage saturation as in the first embodiment. This allows the motor current to be always controlled without executing voltage limiting control. As a result, the occurrence of torque ripple and noise is effectively suppressed. In addition, the torque reduction due to the decrease in the current command value is avoided. It is therefore possible to maintain a high output performance even in the voltage saturation range.

Third Embodiment

An electric power steering device (EPS) according to a third embodiment of the present invention will now be described with reference to the drawings.

The third embodiment is different from the first and second embodiments mainly in the structure of a current command value computation section and voltage saturation prevention control. To facilitate illustration, like or the same reference numerals are given to those components that are like or the same as the corresponding components of the first and second embodiments, and the explanations are omitted.

Figure 6:
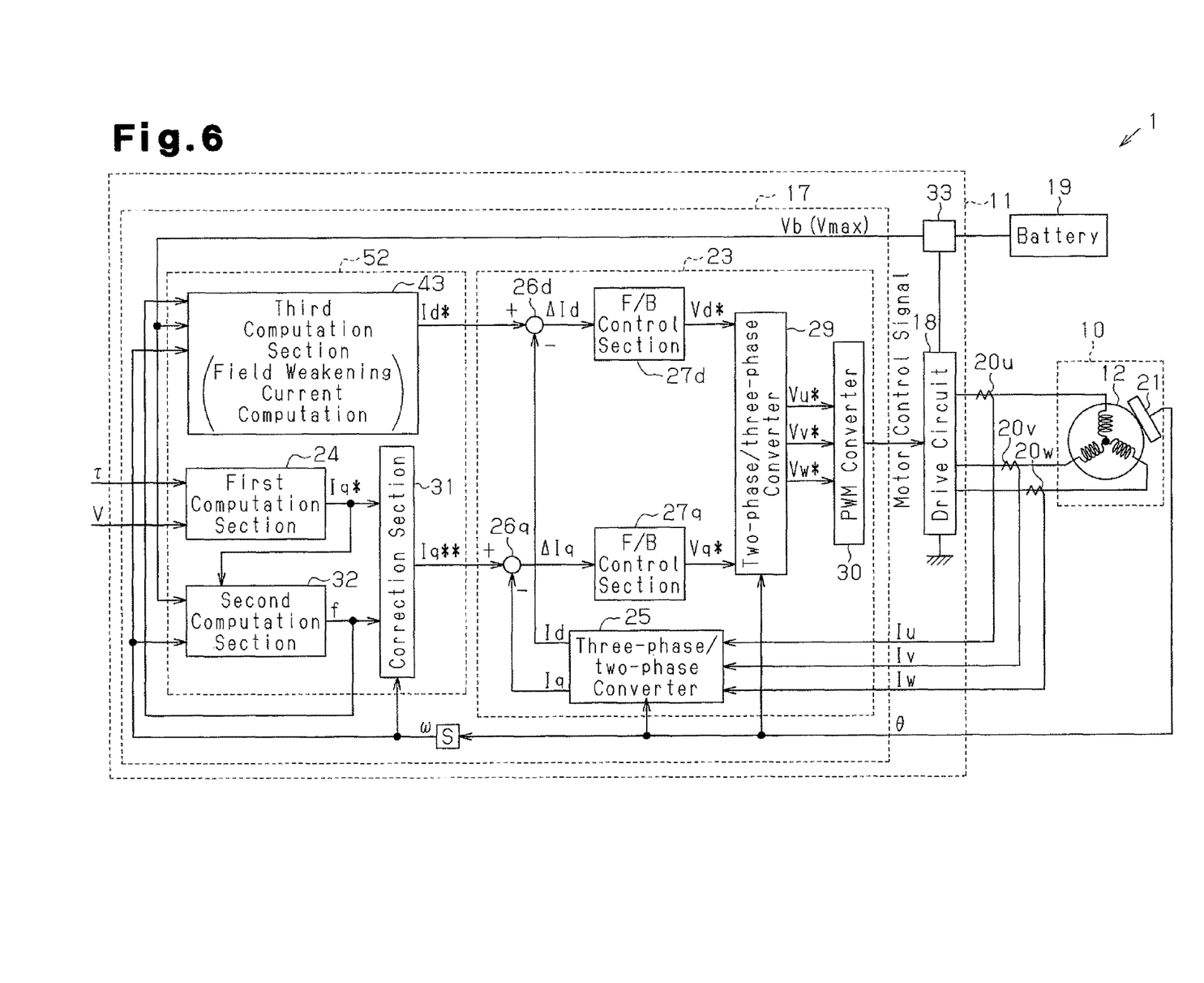
FIG. 6 is a block diagram showing the electrical configuration of the EPS according to a third embodiment of the present invention.
Figure 7:
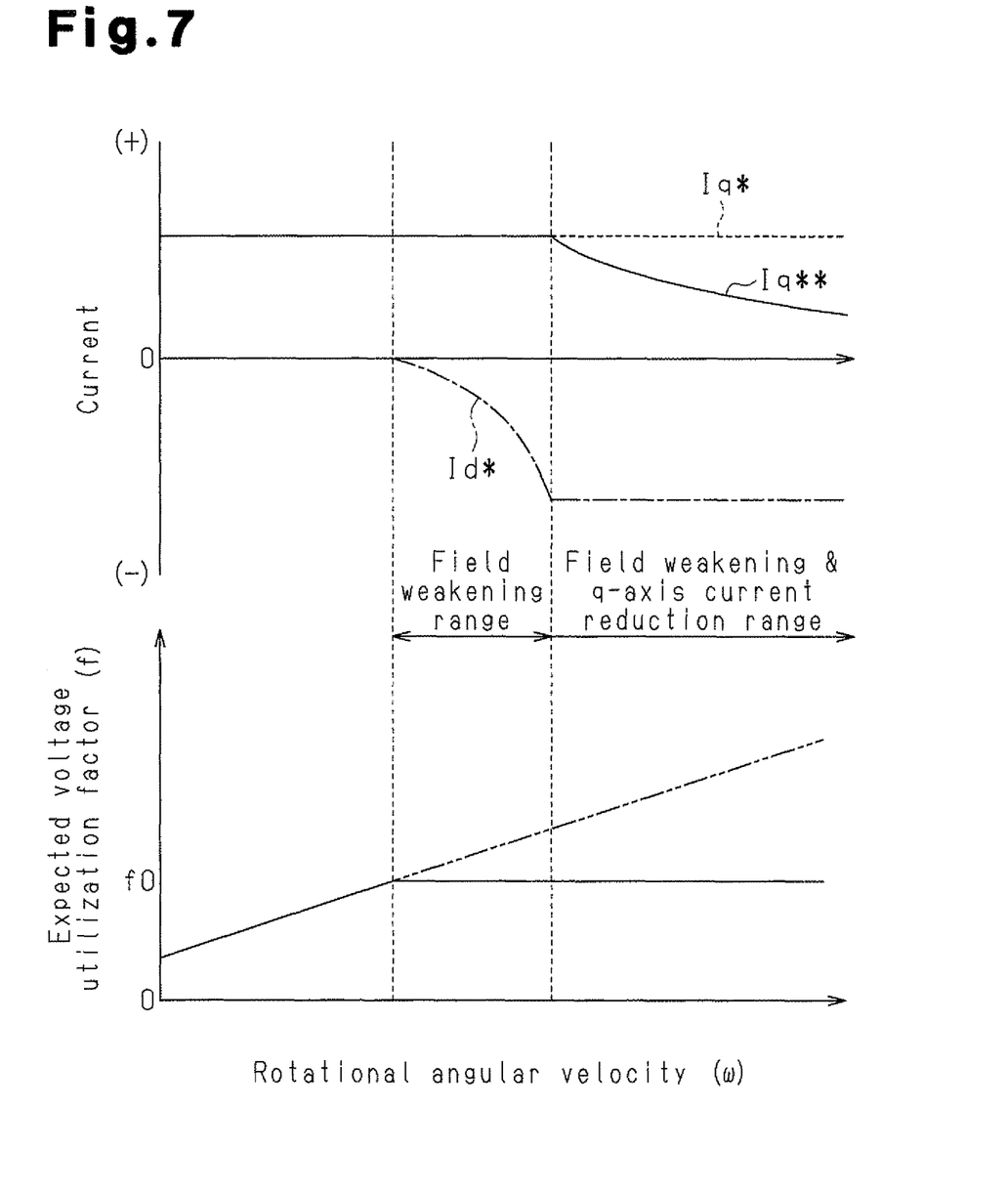
FIG. 7 is a graph for explanatory illustration of a voltage saturation prevention control.

As shown in FIG. 6, a current command value computation section 52 includes a correction section 31 and a third computation section 43. The correction section 31 corrects the q-axis current command value Iq* so as to prevent voltage saturation from occurring. The third computation section 43 computes a d-axis-current command value Id* for executing field weakening control. In the third embodiment, the current command value computation section 52 executes field weakening control for preventing voltage saturation and reduction of the current command value (the q-axis current command value Iq*) based on the expected voltage utilization factor f estimated by the second computation section 32.

Specifically, if the expected voltage utilization factor f exceeds a limit voltage utilization factor fmax, which is expressed by the following expression (13) and a limit value in a range that can be dealt by the field weakening control (f>fmax), the third computation section 43 computes a field weakening current (a d-axis current command value Id*) using the following expression (14).

$$f_{max} = \frac{\sqrt{8\Phi^2\omega^4 L^2 + 3\omega^2 L^2 f_0^2 V_{max}^2 + 3R^2 f_0^2 V_{max}^2}}{\sqrt{3(R^2 + \omega^2 L^2)}V_{max}} \tag{13}$$

$$I_d^* = \frac{-L\omega^2\Phi}{R^2 + \omega^2 L^2} \tag{14}$$

The correction section 31 corrects the q-axis current command value Iq* only when the expected voltage utilization factor f exceeds the limit voltage utilization factor fmax (f>fmax).

That is, there is a limit on the d-axis current that functions as a field weakening current. Therefore, if the d-axis current command value Id* that exceeds the upper limit value is used, it is impossible to suppress the occurrence of voltage saturation. Specifically, in order that the expression (8) for computing the field weakening current (the d-axis current command value Id*) may be satisfied, that is, that the expression (8) may have a real root, the value within the second root of the numerator needs to be greater than zero. The range of the expected voltage utilization factor f in which this condition is met is the range of the following expression (15), and the upper limit value of the range is the limit voltage utilization factor fmax.

$$0 < f \le \frac{\sqrt{8\Phi^2\omega^4 L^2 + 3\omega^2 L^2 f_0^2 V_{max}^2 + 3R^2 f_0^2 V_{max}^2}}{\sqrt{3(R^2 + \omega^2 L^2)}V_{max}} \tag{15}$$

In the third embodiment, if the expected voltage utilization factor f exceeds the limit voltage utilization factor fmax (f>fmax), the correction section 31 computes a new q-axis current command value Iq** based on the following expressions (16), (17).

$$I_q^{**} = \frac{1}{4}\frac{-4R\Phi\omega + f_0\sqrt{6V_{max}^2 R^2 + 6L^2\omega^2 V_{max}^2}}{R^2 + \omega^2 L^2}(I_q^* > 0) \tag{16}$$

$$I_q^{**} = \frac{1}{4}\frac{-4R\Phi\omega - f_0\sqrt{6V_{max}^2 R^2 + 6L^2\omega^2 V_{max}^2}}{R^2 + \omega^2 L^2}(I_q^* < 0) \tag{17}$$

That is, the expressions (16) and (17) are obtained by substituting the expression (14) into the expression (11), making f' equal to f0 (f'=f0), and solving the expression (11) for the q-axis current command value Iq*(Iq). Current control based on the new q-axis current command value Iq obtained in this manner keeps the expected voltage utilization factor f below or equal to the predetermined value f0, which corresponds to the voltage saturation limit, in a wider range.

A procedure of the voltage saturation prevention control will now be explained with reference to FIG. 8.

Figure 8:
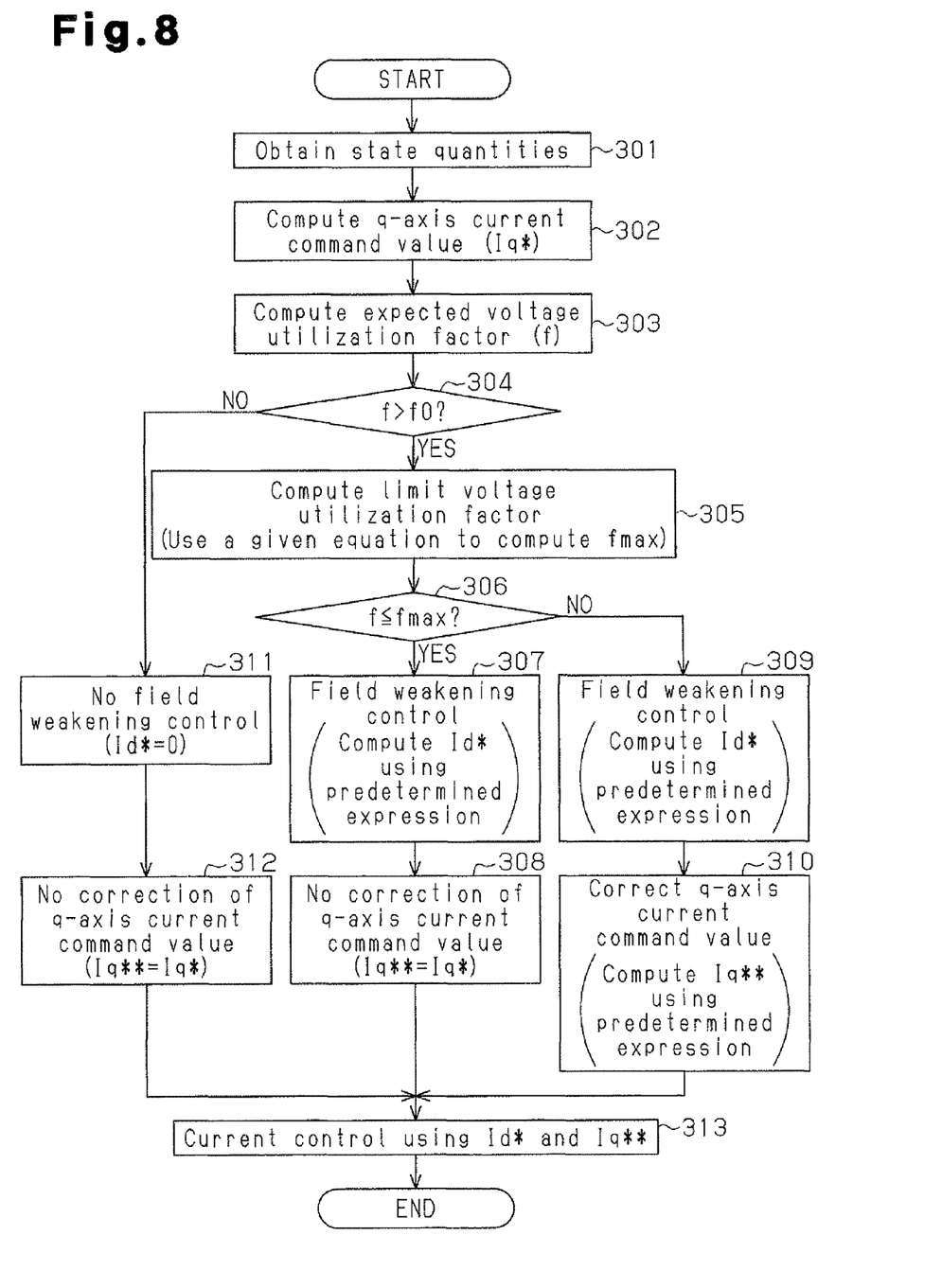
FIG. 8 is a flowchart showing a procedure of voltage saturation prevention control.

Since steps 301 to 304 of the flowchart shown in FIG. 8 are equivalent to steps 101 to 104 of the flowchart shown in FIG. 3, the explanations thereof are omitted.

As shown in FIG. 8, if the expected voltage utilization factor f exceeds the predetermined value f0, which corresponds to the voltage saturation limit (f>f0, step 304: YES), the microcomputer 17 computes the limit voltage utilization factor fmax based on the expression (13) (step 305). The microcomputer 17 then determines whether the expected voltage utilization factor f is less than or equal to the limit voltage utilization factor fmax (step 306). If the expected voltage utilization factor f is less than or equal to the limit voltage utilization factor fmax (f≤fmax, step 306: YES), the microcomputer 17 computes the field weakening current (the d-axis current command value Id*) based on the expression (8), as in the second embodiment (step 307). In this case, the correction of the q-axis current command value Iq* is not executed (Iq**=Iq*, step 308).

If the expected voltage utilization factor f exceeds the limit voltage utilization factor fmax (f>fmax, step 306: NO), the microcomputer 17 computes the field weakening current (the d-axis current command value Id*) (step 309). Further, the microcomputer 17 computes a new q-axis current command value Iq** based on the expressions (16), (17), thereby correcting (renewing) the q-axis current command value Iq* computed in step 302.

In step 304, if the expected voltage utilization factor f is less than or equal to the predetermined value f0, which corresponds to the voltage saturation limit (f≤f0, step 304: NO), the microcomputer 17 neither computes the field weakening current (Id*=0, step 311) nor corrects the q-axis current command value Iq* (Iq**=Iq*, step 312).

In this manner, the microcomputer 17 switches the computation of the current command values (Id*, Iq) of the d/q coordinate system in accordance with the expected voltage utilization factor f. By executing steps 307 to 311, the microcomputer 17** uses the computed (corrected) current command values (Id*, Iq) to execute the current control (step 313**).

According to the third embodiment, voltage saturation is prevented from occurring in a wider range. Particularly, after the expected voltage utilization factor f reaches the limit voltage utilization factor fmax, which is a limit value in the range that can be dealt by the field weakening control, the current command value (the q-axis current command value Iq*) is lowered to maximize the output performance of the EPS. That is, in the use of the EPS, it is important not only to reduce vibration and noise, but also to improve the basic performance. Thus, when employing the above configuration, the basic performance and the quietness are both enhanced by maximizing the output performance of the motor 12, which serves as a drive source.

The above embodiments may be modified as follows.

In each of the above embodiments, the second computation section 32, which functions as an expected voltage utilization factor computation section, is provided separately from the correction section 31 and the d-axis current command value computation section 43. However, these may be integrated.

In each of the above embodiments, voltage limiting process, which is omitted to facilitate illustration, may be used.

In each of the above embodiments, taking into consideration demagnetization due to the field weakening control, the d-axis current command value Id* may be limited.

In each of the above embodiments, the motor control signal is generated by executing the current feedback control. However, the motor control signal may be generated by executing open control.

The invention claimed is:

1. A motor control device for a motor, the motor control device comprising:
    a motor control signal generator configured to generate a motor control signal by executing current control in a d/q coordinate system; and
    a drive circuit configured to output three-phase drive power to the motor based on the motor control signal, wherein:
    based on a rotational angular velocity of the motor and a current command value in the d/q coordinate system, the motor control signal generator estimates an expected voltage utilization factor, which is the ratio of a required output voltage to a maximum voltage applicable to the drive circuit, and corrects the current command value such that the expected voltage utilization factor does not exceed a predetermined value that corresponds to a voltage saturation limit,
    the motor control signal generator computes a d-axis current command value to execute field weakening control such that the expected voltage utilization factor does not exceed the predetermined value, and
    when the expected voltage utilization factor exceeds a limit value in a range that can be dealt by the field weakening control, the motor control signal generator reduces a q-axis current command value, thereby correcting the current command value such that the expected voltage utilization factor does not exceed the predetermined value.

2. The motor control device according to claim 1, wherein the motor control signal generator reduces the q-axis current command value such that the expected voltage utilization factor does not exceed the predetermined value.

3. The motor control device according to claim 1, wherein the motor control signal generator computes a d-axis current command value to execute field weakening control such that the expected voltage utilization factor does not exceed the predetermined value.

4. An electric power steering device comprising the motor control device according to claim 1.

* * * * *